United States Patent
Kulkarni et al.

(10) Patent No.: US 12,474,996 B2
(45) Date of Patent: *Nov. 18, 2025

(54) SYSTEMS AND METHODS FOR CONSISTENCY GROUP BASED SELF HEALING

(71) Applicant: Dell Products L.P., Round Rock, TX (US)

(72) Inventors: Gururaj Kulkarni, Bangalore (IN); Shelesh Chopra, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 458 days.

This patent is subject to a terminal disclaimer.

(21) Appl. No.: 17/937,528

(22) Filed: Oct. 3, 2022

(65) Prior Publication Data

US 2024/0111630 A1 Apr. 4, 2024

(51) Int. Cl.
- *G06F 11/14* (2006.01)
- *G06F 9/54* (2006.01)
- *H04L 41/0897* (2022.01)

(52) U.S. Cl.
CPC .......... *G06F 11/1441* (2013.01); *G06F 9/546* (2013.01); *H04L 41/0897* (2022.05)

(58) Field of Classification Search
None
See application file for complete search history.

(56) References Cited

U.S. PATENT DOCUMENTS

| | | | |
|---|---|---|---|
| 9,384,114 B2 | 7/2016 | Carmel et al. | |
| 10,841,181 B2* | 11/2020 | Côté | H04L 41/0894 |
| 11,455,409 B2 | 9/2022 | Fisher et al. | |
| 11,481,261 B1 | 10/2022 | Frandzel et al. | |
| 11,843,548 B1* | 12/2023 | Devendranath | H04L 47/822 |
| 2014/0059204 A1* | 2/2014 | Nguyen | H04L 43/045 709/224 |
| 2016/0094401 A1* | 3/2016 | Anwar | H04L 43/0817 709/223 |
| 2018/0026856 A1 | 1/2018 | Yang et al. | |
| 2018/0069806 A1* | 3/2018 | Kumar | H04L 47/827 |
| 2018/0131764 A1* | 5/2018 | Suter | G06F 9/547 |

(Continued)

*Primary Examiner* — Charles E Anya
(74) *Attorney, Agent, or Firm* — Workman Nydegger

(57) ABSTRACT

One example method includes, within a microservice architecture: (i) obtaining, via a monitor engine, a resource utilization associated with a set of parameters for each microservice within a consistency group, wherein each microservice within the consistency group is associated with a particular distributed operation, and wherein the consistency group defines, for each microservice within the consistency group, one or more threshold values associated with each parameter of the set of parameters, (ii) determining, via an analytical engine, whether resource utilization satisfies a particular threshold of the one or more threshold values associated with a particular parameter of the set of parameters for a particular microservice within the consistency group, and (iii) based upon resource utilization satisfying the particular threshold of the particular parameter for the particular microservice within the consistency group, implementing a self-healing process to selectively modify resource allocation for one or more microservices within the consistency group.

20 Claims, 12 Drawing Sheets

(56) References Cited

U.S. PATENT DOCUMENTS

| | | | |
|---|---|---|---|
| 2018/0254996 A1* | 9/2018 | Kairali | H04L 67/1031 |
| 2019/0095241 A1* | 3/2019 | Ago | G06F 16/24573 |
| 2019/0102717 A1 | 4/2019 | Wu et al. | |
| 2020/0034179 A1* | 1/2020 | Budigere Vijaya Kumar | G06F 13/4221 |
| 2020/0120000 A1 | 4/2020 | Parthasarathy et al. | |
| 2020/0159592 A1* | 5/2020 | Hansmann | G06F 9/4881 |
| 2020/0366571 A1* | 11/2020 | Vittal | H04L 41/5032 |
| 2021/0011688 A1* | 1/2021 | Sasidharan | G06F 8/10 |
| 2021/0075700 A1 | 3/2021 | Palladino et al. | |
| 2021/0158248 A1* | 5/2021 | Uenishi | G06F 7/575 |
| 2021/0303328 A1* | 9/2021 | Soppin | G06F 9/5005 |
| 2021/0357255 A1* | 11/2021 | Mahadik | G06F 11/3006 |
| 2022/0027051 A1 | 1/2022 | Kant et al. | |
| 2022/0060526 A1* | 2/2022 | Jónsson | H04L 67/306 |
| 2022/0116286 A1* | 4/2022 | Doshi | H04L 41/5025 |
| 2022/0318060 A1* | 10/2022 | Choochotkaew | G06N 5/02 |
| 2022/0318671 A1* | 10/2022 | Chembakassery | G06F 18/24 |
| 2023/0133014 A1 | 5/2023 | Pandit et al. | |
| 2023/0259415 A1* | 8/2023 | Kairali | G06F 9/547 |
| | | | 719/328 |

* cited by examiner

200

| Trace ID | Operation / Consistency Group | Priority Level | Microservice 1 | Microservice 1 Parameters | Microservice 2 | Microservice 2 Parameters | Consistency Group Parameters |
|---|---|---|---|---|---|---|---|
| Abc1234 | Operation 1 / CG 1 | 1 | Microservice A-1 | CPU: x1 %, x2 % Threads: y1, y2 ... | Microservice B-1 | CPU: x3 %, x4 % Threads: y3, y4 ... | CPU: (x1+x3) %, (x2+x4) % Threads: (y1+y3), (y2+y4) ... |
| Abc1235 | Operation 2 / CG 2 | 2 | Microservice A-1 | CPU: x5 %, x6 % Threads: y5, y6 ... | Microservice B-2 | CPU: x7 %, x8 % Threads: y7, y8 ... | CPU: (x5+x7) %, (x6+x8) % Threads: (y5+y7), (y6+y8) ... |
| Abc1236 | Operation 3 / CG 3 | 3 | Microservice A-N | CPU: x9 %, x10 % Threads: y9, y10 ... | Microservice B-N | CPU: x11 %, x12 % Threads: y11, y12 ... | CPU: (x9+x11) %, (x10+x12) % Threads: (y9+y11), (y10+y12) ... |
| ... | ... | | ... | | ... | | |

FIG. 2

| Time | Microservice Name | CPU(%) | Heap(M) | Swap(M) | Threads | ... |
|---|---|---|---|---|---|---|
| 2022-09-28;13:26:01 | Microservice A-1 | 0.24 | 256 | 135 | 93 | ... |
| 2022-09-28;13:26:01 | Microservice A-2 | 10.13 | 256 | 129 | 105 | ... |
| ... | ... | ... | ... | ... | ... | ... |

402 — Obtaining, Via A Monitor Engine, A Resource Utilization Associated With A Set Of Parameters For Each Microservice Within A Consistency Group, Wherein Each Microservice Within The Consistency Group Is Associated With A Particular Distributed Operation Within The Microservice Architecture, And Wherein The Consistency Group Defines, For Each Microservice Within The Consistency Group, One Or More Threshold Values Associated With Each Parameter Of The Set Of Parameters

404 — Determining, Via An Analytical Engine, Whether Resource Utilization Satisfies A Particular Threshold Of The One Or More Threshold Values Associated With A Particular Parameter Of The Set Of Parameters For A Particular Microservice Within The Consistency Group

406 — Based Upon Resource Utilization Satisfying The Particular Threshold Of The Particular Parameter For The Particular Microservice Within The Consistency Group, Throttling Resource Utilization For One Or More Microservices Within The Consistency Group

502
Obtaining, Via A Monitor Engine, A Resource Utilization Associated With A Set Of Parameters For Each Microservice Within A Consistency Group, Wherein Each Microservice Within The Consistency Group Is Associated With A Particular Distributed Operation Within The Microservice Architecture, And Wherein The Consistency Group Defines, For Each Microservice Within The Consistency Group, One Or More Threshold Values Associated With Each Parameter Of The Set Of Parameters 504
Determining, Via An Analytical Engine, Whether Resource Utilization Satisfies A Particular Threshold Of The One Or More Threshold Values Associated With A Particular Parameter Of The Set Of Parameters For A Particular Microservice Within The Consistency Group 506
Based Upon Resource Utilization Satisfying The Particular Threshold Of The Particular Parameter For The Particular Microservice Within The Consistency Group, Implementing A Self-Healing Process To Selectively Modify Resource Allocation For One Or More Microservices Within The Consistency Group

602
Obtaining, Via A Monitor Engine, A Resource Utilization Associated With A Set Of Parameters For Each Microservice Within A Set Of Consistency Groups, Wherein, For Each Particular Consistency Group Within The Set Of Consistency Groups, Each Microservice Within The Particular Consistency Group Is Associated With A Particular Distributed Operation Within The Microservice Architecture, And Wherein Each Respective Consistency Group Of The Set Of Consistency Groups Defines, For Each Microservice Within The Respective Consistency Group, One Or More Threshold Values Associated With Each Parameter Of The Set Of Parameters

604
For A First Consistency Group Of The Set Of Consistency Groups, Determining, Via An Analytical Engine, Whether First Resource Utilization Satisfies A First Particular Threshold Of The One Or More Threshold Values Associated With A First Particular Parameter Of The Set Of Parameters For A First Particular Microservice Within The First Consistency Group

606
For A Second Consistency Group Of The Set Of Consistency Groups, Determining, Via The Analytical Engine, Whether Second Resource Utilization Satisfies A Second Particular Threshold Of The One Or More Threshold Values Associated With A Second Particular Parameter Of The Set Of Parameters For A Second Particular Microservice Within The Second Consistency Group

608
Determining A First Priority Level Associated With The First Consistency Group And A Second Priority Level Associated With The Second Consistency Group

610
Based Upon The First Resource Utilization Satisfying The First Particular Threshold Of The First Particular Parameter For The First Particular Microservice Within The First Consistency Group And The Second Resource Utilization Satisfying The Second Particular Threshold Of The Second Particular Parameter For The Second Particular Microservice Within The Second Consistency Group, Selectively Modifying Resource Utilization For One Or More Microservices Within The First Consistency Group Or The Second Consistency Group In Accordance With The First Priority Level Associated With The First Consistency Group And The Second Priority Level Associated With The Second Consistency Group

*FIG. 6*

SYSTEMS AND METHODS FOR CONSISTENCY GROUP BASED SELF HEALING

FIELD OF THE INVENTION

Embodiments of the present invention generally relate to microservice architecture systems. More particularly, at least some embodiments of the present disclosure relate to systems, hardware, software, computer-readable media, and methods for controlling resource allocation (e.g., by throttling, self-healing, etc.) within a microservice architecture based upon consistency groups of microservices within the microservice architecture.

BACKGROUND

In a monolithic server architecture, components invoke one another via function calls (which may utilize a single programming language). Resource requirements (such as memory, file descriptor usage, CPU usage, TCP connections) for such monolithic architectures are statically sized (e.g., since there is usually a relatively small number of services that perform unique sets of sub-operations for different use cases). Such services in monolithic architectures may run on a single machine or highly available clustered machines or containers.

In a microservice server architecture, services (i.e., "microservices) interact with other services running on different machines (e.g., as agents running on different hosts). Each microservice instance can be configured to perform unique sets of tasks, often in a manner that is independent of task performance by other microservices. Microservices can communicate with other microservices using various communication schemes, such as REST API or message bus architectures. Therefore, resource requirements for different microservices within a microservice architecture can vary from one microservice to the next.

Microservice based architectures continue to grow as an architecture of choice for developing complex application stacks. Microservice architectures can reduce multiple levels of dependencies in agile methodologies and DevOps cycle and can improve go-to-market strategies.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

FIG. 2 illustrates an example data structure depicting various aspects of consistency groups of a microservice architecture according to some example embodiments.

FIG. 3 illustrates an example data structure depicting aspects of microservice performance within a microservice architecture according to some example embodiments.

FIGS. 4, 5, and 6 illustrate example methods according to some example embodiments.

DETAILED DESCRIPTION OF SOME EXAMPLE EMBODIMENTS

Embodiments of the present invention generally relate to microservice architecture systems. More particularly, at least some embodiments of the present disclosure relate to systems, hardware, software, computer-readable media, and methods for controlling resource allocation (e.g., by throttling, self-healing, etc.) within a microservice architecture based upon consistency groups of microservices within the microservice architecture.

As noted above, microservice architectures are a prevalent choice when constructing server architectures for supporting applications. Significant investment has been allocated toward implementing dynamic adjustment of resources within microservice architectures to meet system demand (which can vary). For example, a system may experience a spike in resource demand at unexpected intervals or time periods (which may occur infrequently), and failure to effectively to respond to such spikes can result in microservice failure (which may cascade to the entire system). Example factors that can affect the overall performance of microservice systems (e.g., when a demand surge occurs in any of these factors) may include: (i) memory usage surging continuously to the maximum of committed heap, (ii) file descriptor count exceeding per process ulimit settings, (iii) TCP connections exceeding overall system limit(s), (iv) continuous high system CPU usage, (v) the overall number of threads exceeding beyond an expected range, and/or others.

Figure 1A:
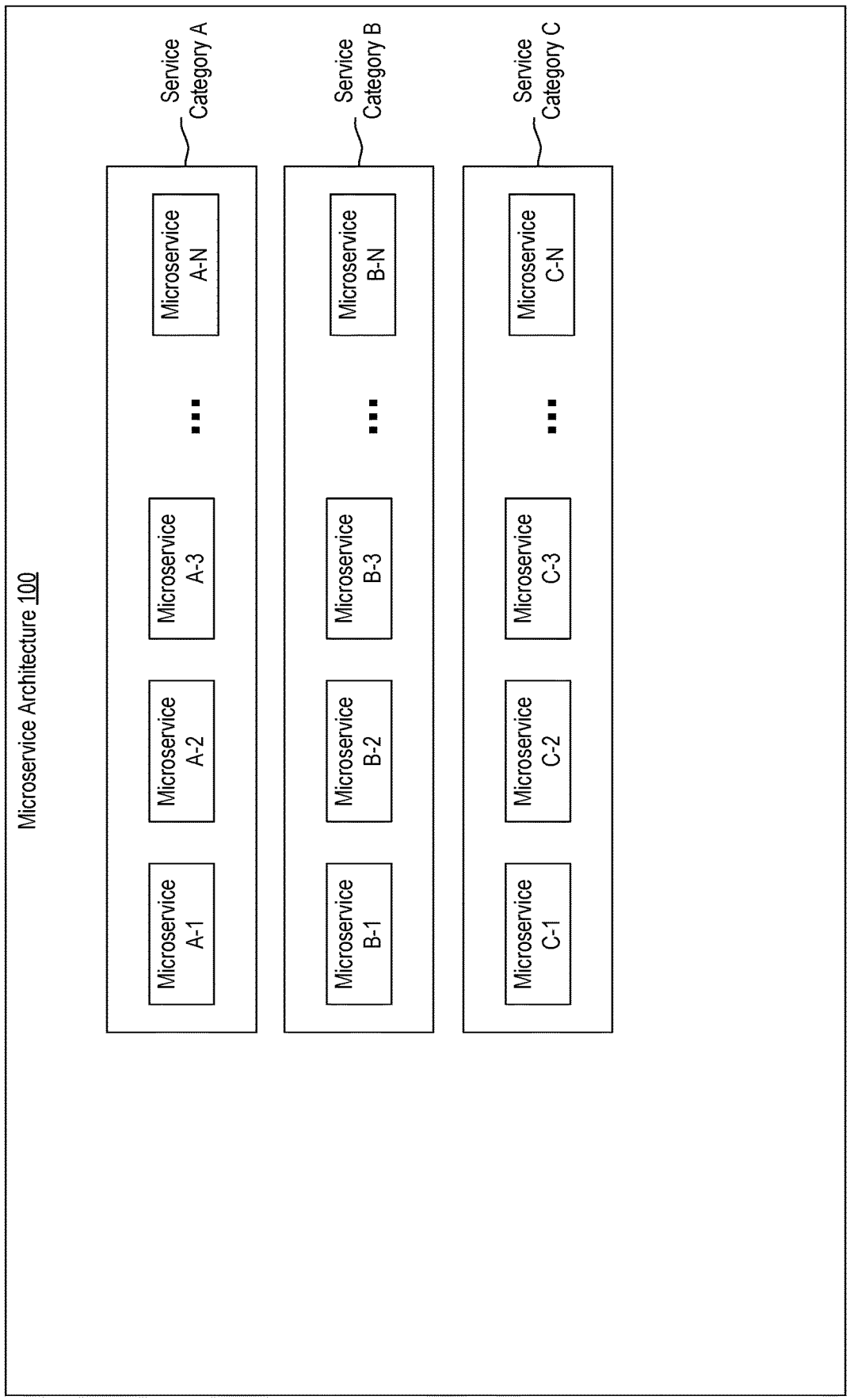
FIG. 1A illustrates an example representation of a microservice architecture according to some example embodiments.

FIG. 1A illustrates an example microservice architecture 100, which may include any number of microservices (which may run as containers or independent component/service within the microservice architecture 100). For instance, FIG. 1A illustrates various microservices A-1, A-2, A-3, . . . A-N, microservices B-1, B-2, B-3, . . . B-N, and microservices C-1, C-2, C-3, . . . C-N (with the ellipses and "N" labels indicating that the microservice architecture 100 may include any number of microservices). The various microservices of the microservice architecture 100 may belong to respective service categories, as indicated by the denotations in FIG. 1A of service category A (to which microservices A-1, A-2, A-3, . . . A-N belong), service category B (to which microservices B-1, B-2, B-3, . . . B-N belong), and service category C (to which microservices C-1, C-2, C-3, . . . C-N belong). Example categories may include, by way of non-limiting example, business services, core services, infrastructure services, and/or others.

In distributed microservice architectures (e.g., microservice architecture 100), the fulfillment of a single request for an operation (e.g., a data protection operation that utilizes a centralized policy) often facilitated by multiple microservices/components (which may belong to different service categories) interacting with one another in a distributed manner. In this regard, each microservice/component individually consumes its own compute and system resources.

As noted above, overutilization of computational resources by one microservice can have downstream effects on other microservices, which may even have a cascading effect on the entire system. By way of illustrative, non-limiting example, a continuous surge of TCP connections by one or more particular microservices may lead to overall connections becoming exhausted system-wide, which will impact performance of other microservices in need of making network connections pursuant to concurrent operations. As another example, a particular operation may involve a first microservice (e.g., microservice A-1 of service category A) and a second microservice in a different service category (e.g., microservice B-1 of service category B). If the first microservice utilizes an excessive number of threads for a specific task, the second microservice (and/or others) may be prevented from spawning threads due to system limits.

Furthermore, resource utilization parameters of microservices may have interdependency impacts where high resource usage in one parameter affects resource usage of another parameter. For instance, if a microservice is using a high number of file descriptors, then memory and CPU utilization may consequently spike. In view of the foregoing, periodic monitoring of individual parameter-centric resource usage for microservices within a microservice architecture (e.g., microservice architecture 100) may prove insufficient for informing appropriate responses to resource overutilization.

Accordingly, at least some embodiments of the present disclosure are directed to managing resource utilization for microservices within a microservice architecture (e.g., microservice architecture 100 of FIG. 1A) on the basis of consistency groups of microservices within the microservice architecture. Consistency groups may be defined as groups of microservices that are implicated/associated with the performance of particular distributed operations within the microservice architecture. Microservices for consistency groups may be defined, in some instances, utilizing trace IDs associated with distributed operations. The consistency groups may further define parameters of resource utilization for the microservices within the consistency groups (e.g., where parameter thresholds may be defined pursuant to an onboarding process, based on service level agreements (SLAB), based on hardware specifications and/or best practices, etc.).

A monitor engine associated with the microservice architecture may obtain resource utilization of the microservices within the various consistency groups within the microservice architecture. Various aspects of resource utilization may be obtained, such as memory utilization, heap usage, file descriptor usage, TCP connections, CPU usage, thread usage, and/or others. System-wide resource usage (e.g., for a consistency group that includes all microservices of the microservice structure) may additionally be obtained.

The resource utilization information may be analyzed by an analytical engine to determine compliance of microservices with parameter thresholds defined by their respective consistency group(s). Based upon such analysis, the analytical engine may issue resource allocation modifications, such as resource throttling, self-healing operations (e.g., dynamically increasing resources allocated to certain microservices), and/or others. The resource allocation modifications may be performed in response to satisfaction of thresholds (e.g., "hard" thresholds) defined for resource usage of the microservices of the consistency groups (e.g., different thresholds may exist for different parameters, such as CPU usage, threads, etc.). In some instances, prefatory or "soft" thresholds may additionally be defined for various parameters of resource usage of the microservices within the consistency groups, the satisfaction of which may trigger lesser responses (e.g., notification to one or more system administrators).

The obtaining of resource utilization information and/or issuing of resource modifications may be performed in various ways, such as utilizing routing slip patterns/algorithms or event-based techniques on a message bus architecture.

The resource allocation modifications for different microservices within consistency groups may be performed in accordance with priority levels for the various consistency groups (e.g., where a security threat response operation takes precedence over other operations, which may trigger dynamic allocation of resources to microservices within the consistency group associated with the security threat response operation instead of other microservices when computational resources are broadly strained). Furthermore, the resource allocation modifications may be implemented in a minimal-impact manner, such as during an idle time interval identified for the microservice.

Utilizing a consistency group driven approach, as described herein, to assess and respond to resource utilization of microservices within a microservice architecture may account for the effects of inter-parameter dependency and inter-microservice dependency associated with microservice resource usage. Such techniques can contribute to a mitigation of cascading effects that can result from resource over-utilization by one or more microservices.

Figure 1B:
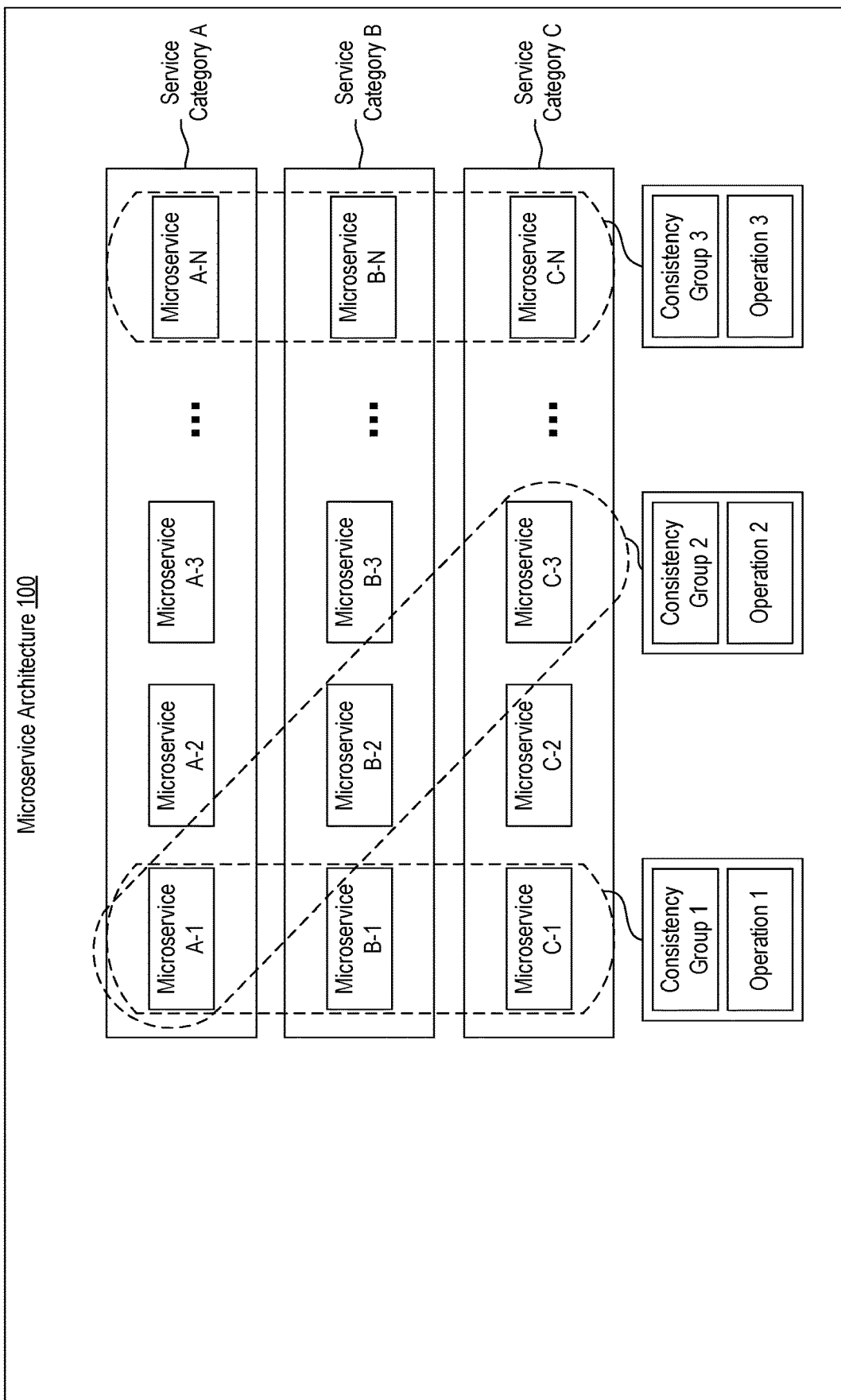
FIG. 1B illustrates example consistency groups of microservices within the microservice architecture according to some example embodiments.

FIG. 1B illustrates example consistency groups of microservices within the microservice architecture 100 according to some example embodiments. In particular, FIG. 1B illustrates consistency group 1 denoted by a dashed boundary, which includes microservice A-1 of service category A, microservice B-1 of service category B, and microservice C-1 of service category C. As noted above, each consistency group may be defined by associated with performance of a distributed operation within the microservice architecture 100, as indicated in FIG. 1B by "Operation 1" being associated with consistency group 1 by grouping within a similar boundary box. For example, consistency group 1 may include all microservices utilized for performance of a compliance check operation, job scheduling and processing operation, copy management operation, or other type of operation (even where the needed microservices are associated with different service categories).

FIG. 1B also illustrates other consistency groups, including consistency groups 2 and 3. Consistency group 2 includes microservice A-1 of service category A, microservice B-2 of service category B, and microservice C-3 of service category C. As indicated by consistency groups 1 and 2, in some instances, a microservice may be part of more than one consistency group (e.g., with microservice A-1 being part of consistency groups 1 and 2). Consistency group 3 includes microservice A-N of service category A, microservice B-N of service category B, and microservice C-N of service category C. Similar to consistency group 1, consistency groups 2 and 3 are associated with respective distributed operations (i.e., operations 2 and 3, respectively).

Although FIG. 1B only illustrates three consistency groups, a microservice architecture 100 may include any number of consistency groups. Furthermore, although not illustrated in FIG. 1B, a consistency group that includes all services within the microservice architecture 100 may be defined (e.g., to track total system resource utilization, as will be described in more detail hereinafter).

In some implementations, consistency groups are defined for a microservice architecture based upon a trace ID associated with distributed operations for the microservice architecture. Attention is directed to FIG. 2, which illustrates a table 200 that depicts various aspects of consistency group identification/definition for the microservice architecture 100 of FIGS. 1A and 1B. As indicated by table 200, trace IDs (under the column "Trace ID") may be identified for various operations (under the "Operation/Consistency Group column), which implicate various microservices within a microservice architecture (under the "Microservice 1", "Microservice 2" columns) for performance of the operations. In the example of FIG. 2, operation 1 is associated with trace ID "Abc1234", which implicates microservice A-1 and microservice B-1 for the performance of operation 1. Such microservices are thus identified with consistency group 1 ("CG 1") (microservice C-1 is not shown but may be regarded as included in CG 1, as indicated in FIG. 1B).

FIG. 2 similarly illustrates operation 2 as being associated with trace ID "Abc1235", which implicates microservices A-1 and B-2 (microservice C-3 is not shown but may be regarded as included in CG 2, as indicated in FIG. 1B), resulting in their identification with consistency group 2 ("CG 2"). FIG. 2 also illustrates operation 3 as being associated with trace ID "Abc1236", which implicates microservices A-N and B-N (microservice C-N is not shown but may be regarded as included in CG 3, as indicated in FIG. 1B), resulting in their identification with consistency group 3 ("CG 3").

A consistency group may define, for the microservice(s) included therein, various thresholds associated with performance parameters for the microservice(s), as indicated in FIG. 2. For example, table 200 depicts various thresholds for performance parameters (e.g., under columns "Microservice 1 Parameters", "Microservice 2 Parameters") of microservices A-1 and B-1 of consistency group 1, including thresholds for CPU usage (e.g., CPU usage) and number of threads (other parameters may include, by way of non-limiting example, memory usage, heap usage, swap usage, number of file descriptors (FDs), number of transmission control protocol connections (TCP connections), jobs distribution, elastic search (ES) latency, garbage collection (GC) pause, or garbage collection (GC) latency). In the example of FIG. 2, microservice A-1 thresholds for CPU usage are depicted as "x1%" and "x2%", and thresholds for the number of threads are depicted as "y1" and "y2". In this regard, a consistency group may define multiple thresholds for one or more performance parameters of the microservice(s) associated with the consistency group. For instance, one threshold of a plurality of thresholds for a parameter of a microservice may include a "soft", prefatory, or initial threshold that triggers a prefatory response when the soft threshold is satisfied (e.g., a notification to a system administrator), whereas another threshold of the plurality of thresholds for the parameter of the microservice may include a "hard" or final threshold that triggers a heightened response when the hard threshold is satisfied (e.g., a throttling of resources, a self-healing operation, etc., as will be described in more detail hereinafter).

The thresholds set for the performance parameters of the microservices within the consistency groups may be at least partially user-defined (e.g., pursuant to an onboarding process, based on service level agreements (SLAB), etc.) and/or may be defined based upon hardware characteristics, use cases (e.g., where default settings are designed for particular implementation environments), and/or other factors.

FIG. 2 also illustrates various thresholds (e.g., defined by respective consistency groups) for performance parameters of microservice B-1 ("x3%, x4%" for CPU usage and "y3, y4" for threads, with respect to consistency group 1), microservice A-1 ("x5%, x6%" for CPU usage and "y5, y6" for threads, with respect to consistency group 2), microservice B-2 ("x7%, x8%" for CPU usage and "y7, y8" for threads, with respect to consistency group 2), microservice A-N ("x9%, x10%" for CPU usage and "y9, y10" for threads, with respect to consistency group 3), and microservice B-N ("x11%, x12%" for CPU usage and "y11, y12" for threads, with respect to consistency group 3).

One will appreciate, in view of the present disclosure, that a consistency group may define any number of thresholds for performance parameters of microservices associated with the consistency group.

A consistency group may also define group-wide parameter thresholds (e.g., thresholds for cumulative CPU usage, threads, and/or any other parameters for all microservices within the consistency group) in addition or alternative to microservice-specific parameter thresholds. For example, table 200 depicts various consistency group parameter thresholds (e.g., under the column "Consistency Group Parameters") that define thresholds for group-wide or cumulative (or otherwise combined) resource consumption of all microservices within the consistency group. For example, for consistency group 1, table 200 depicts a consistency group soft threshold for CPU usage of "(x1+x3) %", a consistency group hard threshold for CPU usage of "(x2+x4) %", a consistency group soft threshold for threads of "(y1+y3)", and a consistency group hard threshold for threads of "(y2+y4)". Although table 200 depicts the consistency group parameter thresholds as sums of the microservice-specific thresholds for the microservices within the consistency group, microservice-specific thresholds may be combined in other ways to provide consistency group parameter thresholds, or consistency group parameter thresholds may be determined independently of microservice-specific thresholds. In some instances, microservice-specific parameter thresholds are not defined by a consistency group, and the consistency group only defines group-wide parameter thresholds (or vice-versa).

Similar to the microservice-specific parameters, various group-wide or consistency group parameters may be included (other parameters may include, by way of non-limiting example, memory usage, heap usage, swap usage, number of file descriptors (FDs), number of transmission control protocol connections (TCP connections), jobs distribution, elastic search (ES) latency, garbage collection (GC) pause, or garbage collection (GC) latency).

Furthermore, similar to the microservice-specific soft and hard thresholds, the group-wide or consistency group soft and hard thresholds may trigger different responses upon satisfaction thereof (e.g., alerting for satisfaction of soft thresholds, consistency-group throttling or modification to resource allocation for satisfaction of hard thresholds, etc.). The thresholds set for the group-wide or consistency group performance parameters may be at least partially user-defined (e.g., pursuant to an onboarding process, based on service level agreements (SLAB), etc.) and/or may be defined based upon hardware characteristics, use cases (e.g., where default settings are designed for particular implementation environments), and/or other factors.

One will appreciate, in view of the present disclosure, that a consistency group may define any number of group-wide or consistency group performance parameters thresholds. Furthermore, although the example of FIG. 2 focuses, in at least some respects, on "group-wide" parameter thresholds that apply to the entire group, a consistency group may define parameter thresholds for any set of microservices within the consistency group, where the set of microservices may include one, more than one, or all microservices within the consistency group.

The ellipses of FIG. 2 indicate that any number of microservices may be included in a consistency group, any number of consistency groups may be included in a microservice architecture, and any number of parameters or thresholds may be defined for microservices within consistency groups or for consistency groups themselves. Furthermore, FIG. 2 illustrates that consistency groups of a microservice architecture (e.g., microservice architecture 100) may be associated with a respective priority level (e.g., under the column "Priority Level" in the example of FIG. 2). In some instances, the priority level associated with a consistency group may influence resource allocation/utilization modifications triggered by satisfaction of one or more performance parameter thresholds of one or more microservices of the consistency group or of the entire consistency group. In the example of FIG. 2, consistency group 1 is associated with a priority level of 1, consistency group 2 is associated with a priority level of 2, and consistency group 3 is associated with a priority level of 3.

Figure 1C:
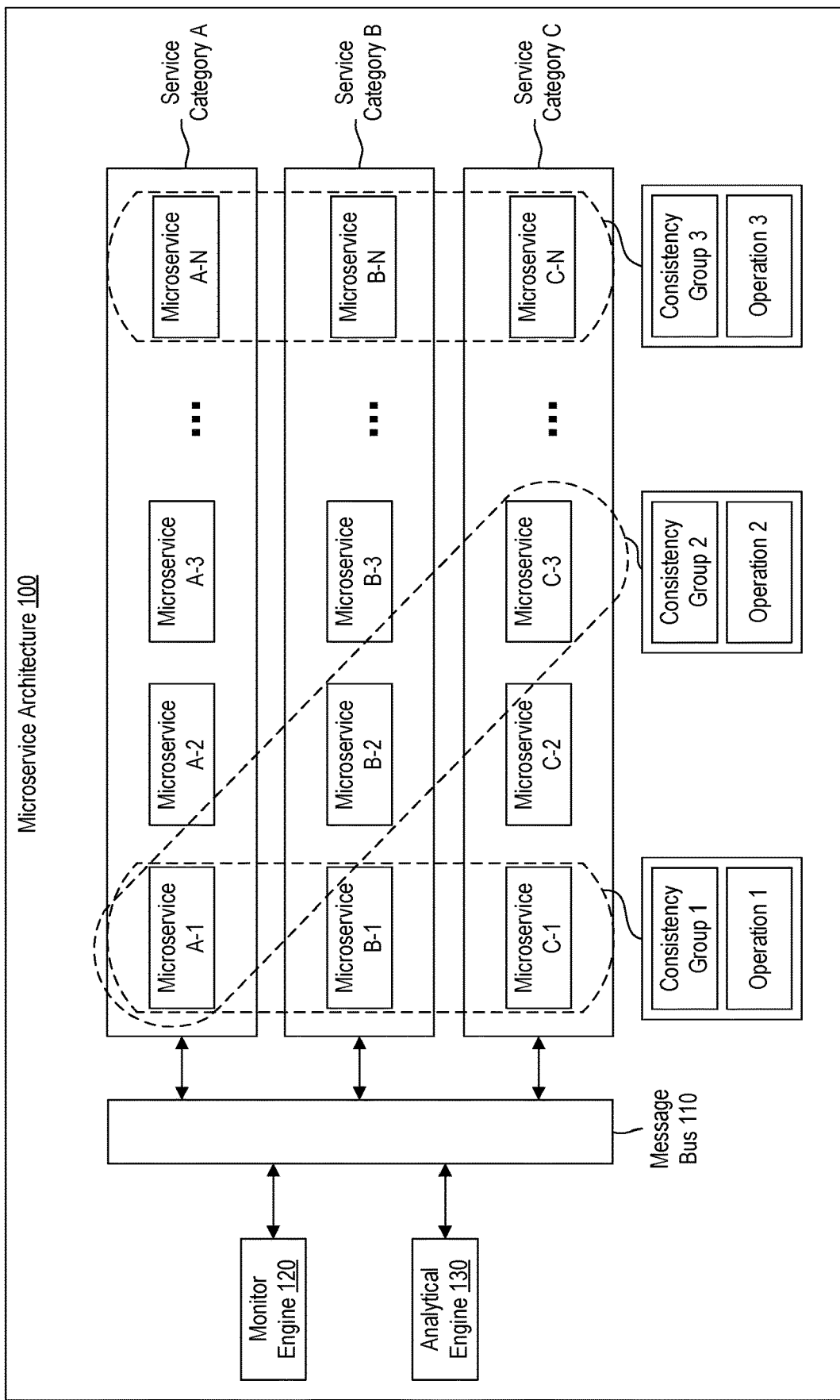
FIG. 1C illustrates example representations of monitor and analytical engines for determining and/or modifying resource utilization of microservices within the microservice architecture according to some example embodiments.

FIG. 1C illustrates additional aspects of the microservice architecture 100, including a message bus 110, monitor engine 120, and an analytical engine 130. The monitor engine 120 and the analytical engine 130 may be implemented as one or more services/executable components within the microservice architecture 100. As will be described in more detail hereinbelow, the monitor engine 120 is configured to collect (e.g., periodically) the performance parameters/metrics/statistics associated with the microservices of the various service categories within the microservice architecture 100. In some implementations, the monitor engine 120 advertises or publishes the resource usage of each microservice within each consistency group for each of the performance parameters (e.g., via the message bus 110 utilizing asynchronous communication using SAGA/routing slip patterns/techniques). The monitor engine 120 may additionally monitor overall system resource utilization (e.g., for the system consistency group that includes all microservices). In some implementations, the monitor engine 120 coordinates and checks distributed transactions across multiple microservices within the microservice architecture 100.

The analytical engine 130 is configured to periodically analyze the performance parameters/metrics/statistics (e.g., by probing via the message bus 110) as advertised or published by the monitor engine 120) associated with the microservices within the microservice architecture 100. The analytical engine 130 interprets the performance statistics of the microservices (e.g., as published to the message bus 110 by the monitor engine 120) with a consistency group paradigm, such as by utilizing correlation ID or trace ID to group microservices into consistency groups based on their associated with particular distributed operations (as discussed herein with reference to FIG. 2). The thresholds discussed hereinabove may further be defined with the consistency groups. In this way, the analytical engine 130 may determine whether any microservice (or entire consistency group) satisfies any thresholds and appropriately respond for every transaction on the microservice architecture 100.

The analysis and/or actions of the analytical engine 130 may utilize routing slip algorithms/techniques to determine and/or issue an appropriate type of throttling or other response (e.g., alerting, dynamically increasing resources, etc.) for microservices (or sets of microservices within consistency groups), based on performance characteristics of the microservices (or sets of microservices within consistency groups) violating permitted limits.

Figure 1D:
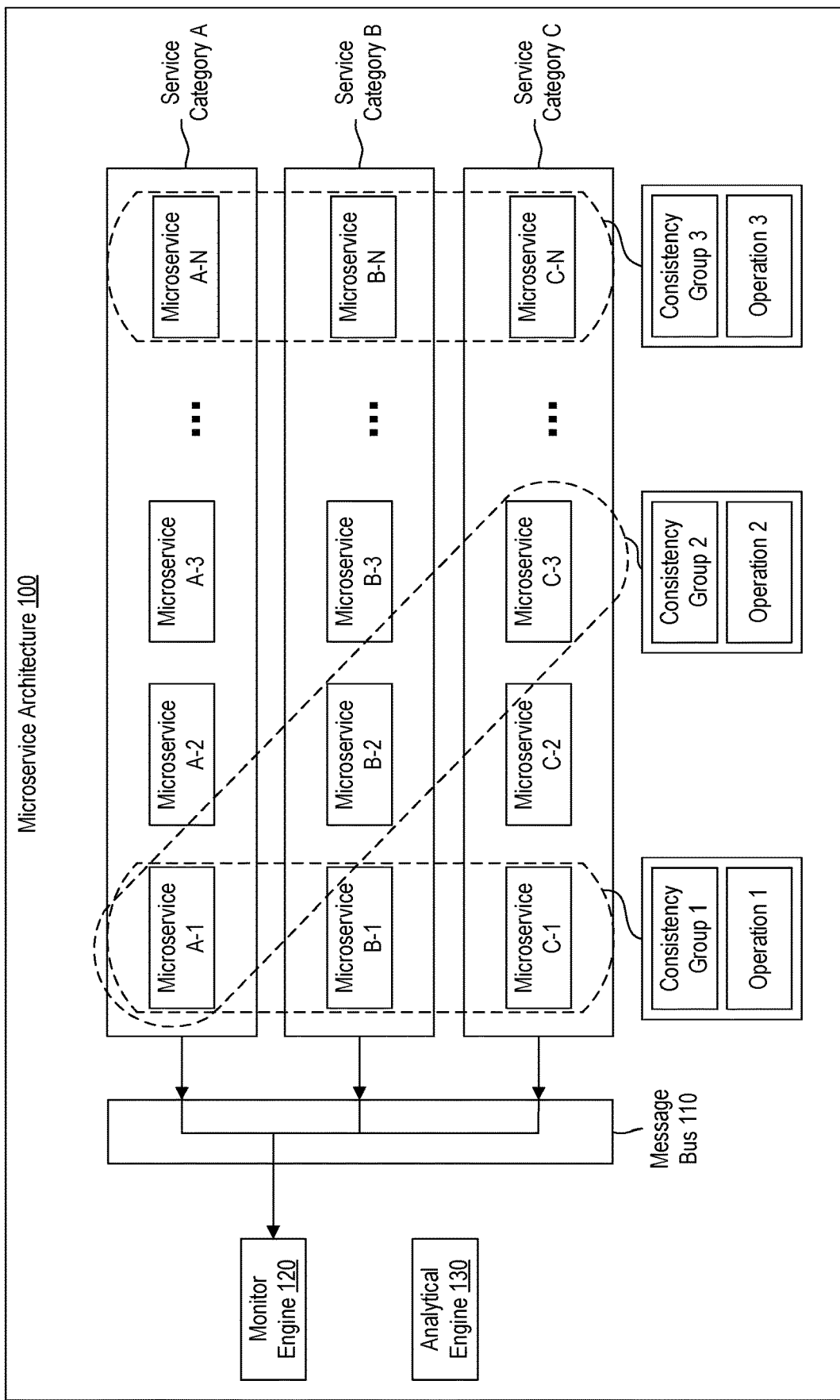
FIGS. 1D, 1E, and 1F depicts example information flow among the microservices, the monitor engine, and the analytical engine of the microservice architecture according to some example embodiments.
Figure 1E:
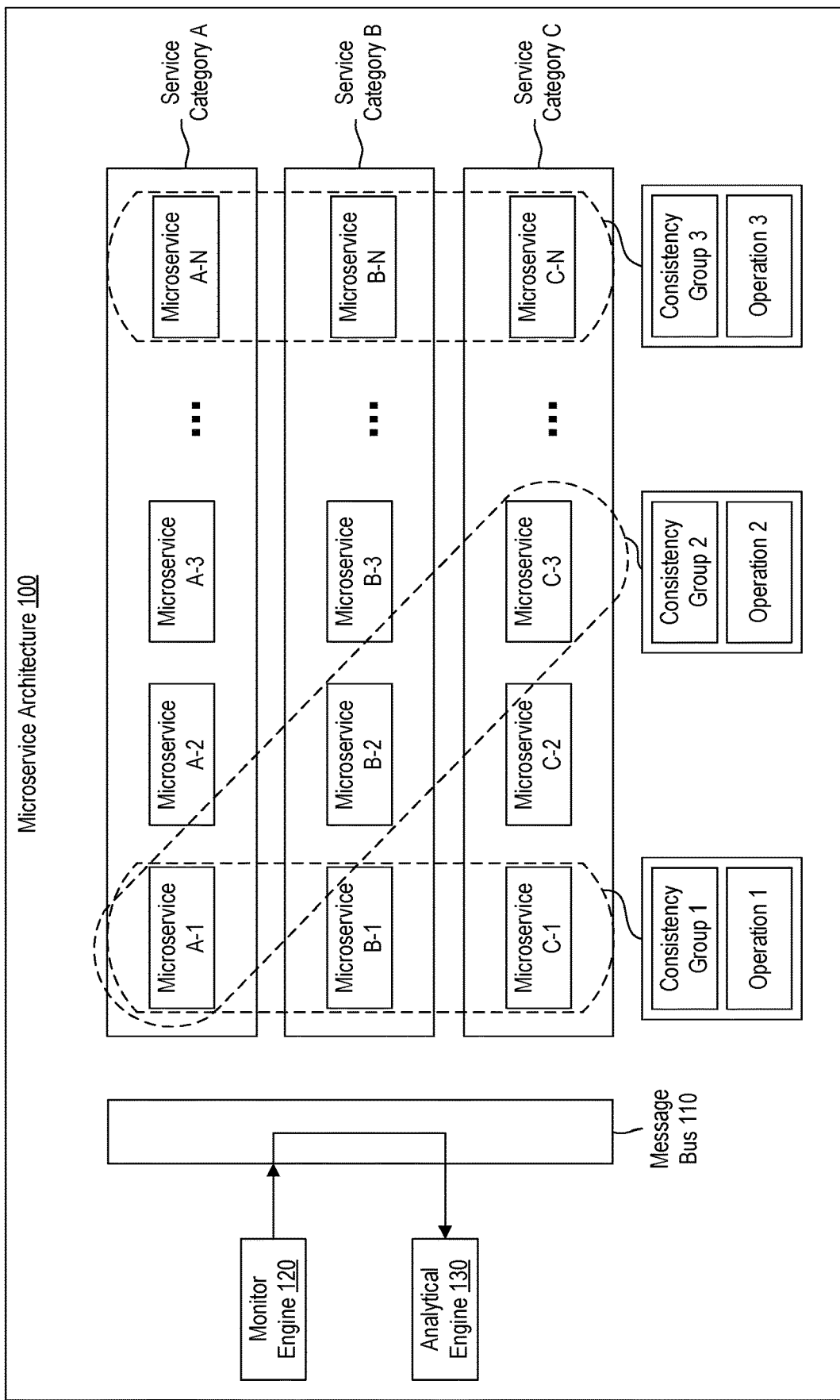

In accordance with the foregoing, FIG. 1D conceptually depicts an example of the monitor engine 120 collecting resource utilization (e.g., performance statistics/metrics) for the various microservices within the service categories of the microservice architecture 100, as indicated by the arrows extending from the service categories toward the message bus 110 and ultimately toward the monitor engine 120. FIG. 1E conceptually depicts an example of the monitor engine 120 publishing the collected resource utilization for the microservices within the microservice architecture to the message bus 110 (as indicated by the arrow extending from the monitor engine 120 to the message bus 110). FIG. 3 illustrates a conceptual representation in the form of a table 300 depicting the resource utilization within the microservice architecture 100 as published by the monitor engine 120 to the message bus 110. The table 300 depicts, for each resource utilization entry, the time of the resource utilization, the microservice name, and the value of the measured parameter (e.g., measured parameters may include, by way of example, CPU usage, memory usage, heap usage, swap usage, number of file descriptors (FDs), number of transmission control protocol connections (TCP connections), jobs distribution, elastic search (ES) latency, garbage collection (GC) pause, garbage collection (GC) latency, and/or others).

FIG. 1E also depicts the analytical engine 130 accessing the resource utilization from the message bus 110 (as indicated by the arrow extending from the message bus 110 to the analytical engine 130). As noted above, the analytical engine 130 determines whether the resource utilization for a microservice (or set of microservices) satisfies one or more parameter thresholds defined by the consistency group with which the microservice (or set of microservices) is associated.

In response to determining that the resource utilization for a particular microservice (or particular set of microservices within a consistency group) satisfies one or more parameter thresholds defined by the consistency group with which the particular microservice (or particular set of microservices) is associated, the analytical engine 130 may perform corrective actions to address the resource over-utilization, which may prevent cascading errors that may result from the resource over-utilization. As indicated herein, the corrective actions may take on various forms. For example, corrective action implemented via an analytical engine 130 may include throttling resource utilization for the particular microservice (or particular set of microservices within a consistency group). Throttling resource allocation may include throttling the concurrency (e.g., number of jobs being processed, number of copies being deleted, number of discovery operations being performed, number of restores being performed, etc.) for the particular microservice (or particular set of microservices associated with a consistency group for a particular distributed operation/transaction), such as by utilizing conditional routing mechanisms to slow down and/or adjust concurrency. Throttling may additionally or alternatively include imposing limits on the resource utilization of the particular microservice (or particular set of microservices), such as by establishing or modifying limits on the number of threads, CPU usage, and/or any other performance parameter(s). Throttling parameters may be determined based upon the parameter thresholds that were determined to be satisfied.

As noted above with reference to FIG. 2, consistency groups may be associated with a respective priority level. In some instances, the analytical engine 130 may consider the priority level for a consistency group in determining how and/or whether to throttle resource utilization for one or more microservices within the consistency group. For instance, where a consistency group is associated with a high priority level (e.g., for critical operations such as responding to a security threat), an analytical model may refrain from throttling resource utilization of one or more microservices within the consistency group in response to detecting excessive resource utilization within the consistency group.

Furthermore, as noted above, the analytical engine 130 may utilize system-wide resource utilization (e.g., resource utilization of a system consistency group that includes all microservices within the microservice architecture) to determine whether and/or how to throttle resources. System resource utilization parameters may include, for example, system CPU usage, system memory usage (e.g., swap and resident memory), input/output processing, network utilization, and/or others. In some implementations, the analytical engine may selectively refrain from throttling resources in response to determining that the resource over-utilization of one or more microservices within one or more consistency groups does not threaten system stability.

Corrective action may additionally or alternatively include implementing a self-healing process to selectively modify (e.g., increase) resource allocation for a particular microservice (or particular set of microservices) within a consistency group. Self-healing operations may be user-defined (e.g., during an onboarding process, based upon service level agreements, etc.) and/or may be based upon hardware characteristics, use cases, available system resources, and/or other factors. For example, a user may define that, in response to detecting excessive computational resource usage by one or more microservices in one or more consistency groups, a self-healing operation may include adding 20% more computational resources to the one or more microservices in the one or more consistency groups.

One will appreciate that a self-healing process may involve other types of parameters, such as memory and/or storage space availability, processing power, number of threads available, and/or others. Furthermore, different self-healing processes may be defined for different consistency groups (e.g., based upon consistency group priority level), and multiple self-healing operations may be defined for the same consistency group (e.g., for responding to satisfaction of different resource utilization parameter thresholds for microservices within the consistency group). Still furthermore, a self-healing process may include dynamically reducing resource allocation for some microservices in some consistency groups (e.g., lower priority consistency groups) to make resources available for allocation toward other microservices in other consistency groups (e.g., higher priority consistency groups).

Figure 1F:
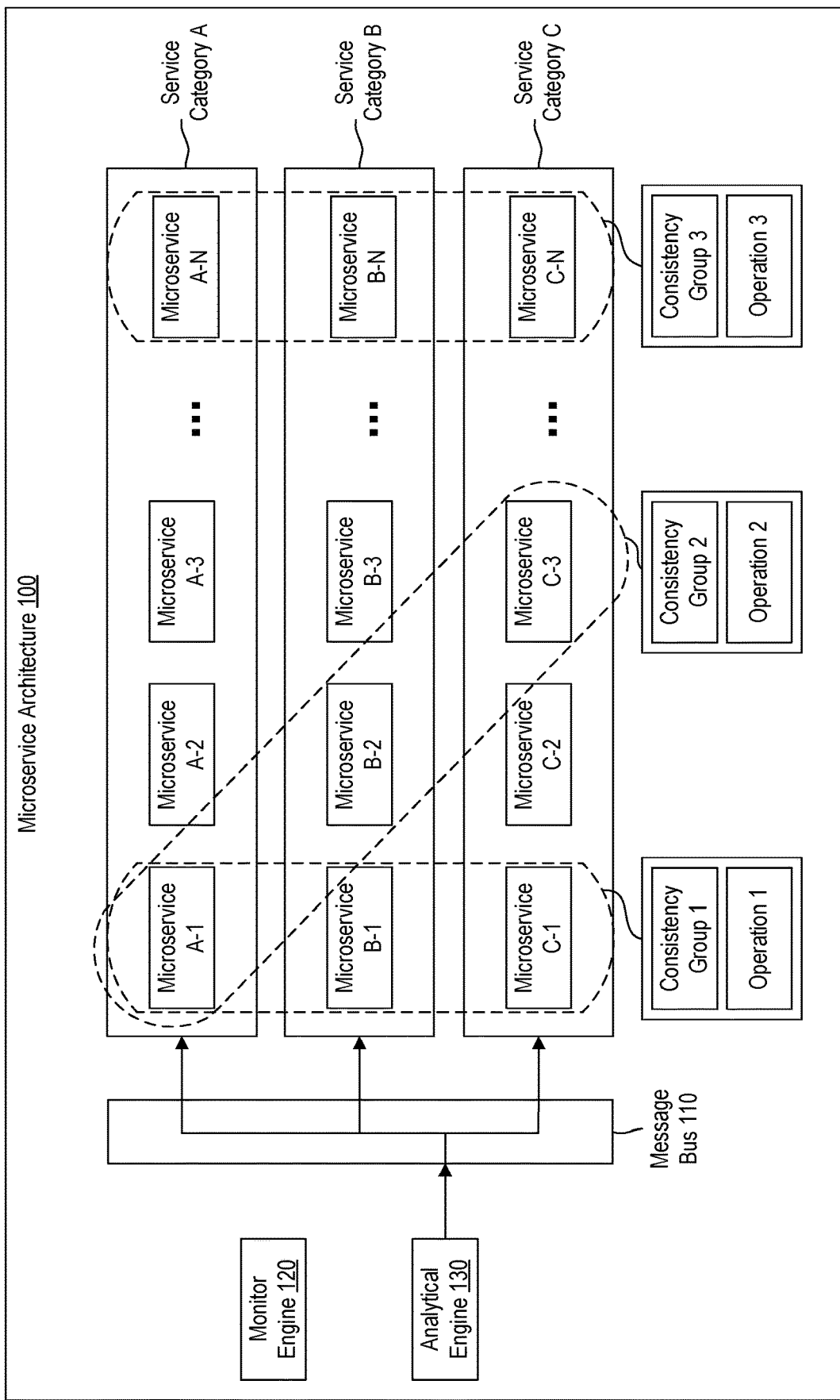

Corrective action of an analytical engine 130 may be implemented in various ways, such as by utilizing routing slip techniques to issue throttling or facilitate selective modification of resource allocation for one or more microservices within one or more consistency groups. FIG. 1F conceptually depicts the analytical engine 130 issuing corrective action protocols to one or more microservices within the microservice architecture 100 via the message bus 110 (as indicated in FIG. 1F by the arrows extending from the analytical engine 130 toward the message bus 110 and ultimately toward the microservices within service categories A, B, and C of the microservice architecture).

FIGS. 4, 5, and 6 illustrate example methods according to some example embodiments. The operations of the methods discussed herein may be performed utilizing one or more computing entities/devices/systems (see FIG. 3) within the context of a microservice architecture (see FIGS. 1A-1F), as discussed herein. It is noted with respect to the disclosed methods that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited. Some embodiments may omit one or more of the operations discussed herein.

Act 402 of method 400 of FIG. 4 includes obtaining, via a monitor engine, a resource utilization associated with a set of parameters for each microservice within a consistency group, wherein each microservice within the consistency group is associated with a particular distributed operation within the microservice architecture, and wherein the consistency group defines, for each microservice within the consistency group, one or more threshold values associated with each parameter of the set of parameters. In some implementations, the microservice(s) within the consistency group is/are identified based upon a trace ID associated with the particular distributed operation within the microservice architecture. In some instances, each microservice within the consistency group is associated with a service category within the microservice architecture. In some instances, at least one microservice within the consistency group is associated with one or more other consistency groups within the microservice architecture. In some implementations, the set of parameters includes one or more of: processor usage, memory usage, heap usage, swap usage, number of threads, number of file descriptors, number of transmission control protocol connections, jobs distribution, elastic search latency, garbage collection pause, or garbage collection latency. In some instances, at least some of the one or more threshold values are determined based upon one or more service level agreements. In some implementations, the one or more threshold values include one or more soft thresholds and one or more hard thresholds for at least some parameters of the set of parameters. In some instances, the monitor engine publishes the resource utilization associated with the set of parameters for each microservice within the consistency group to a message bus. In some instances, the resource utilization is published to the message bus utilizing routing slip techniques.

Act 404 of method 400 includes determining, via an analytical engine, whether resource utilization satisfies a particular threshold of the one or more threshold values associated with a particular parameter of the set of parameters for a particular microservice within the consistency group. In some implementations, the analytical engine accesses the resource utilization from the message bus to determine whether the resource utilization satisfies the threshold of the one or more threshold values associated with the particular parameter of the set of parameters for the particular microservice within the consistency group. In some implementations, the particular threshold of the one or more threshold values includes a hard threshold of the one or more hard thresholds.

Act 406 of method 400 includes, based upon resource utilization satisfying the particular threshold of the particular parameter for the particular microservice within the consistency group, throttling resource utilization for one or more microservices within the consistency group. Act 406 may include determining throttling parameters for the throttling of resource utilization for the one or more microservices within the consistency group. In some instances, throttling resource utilization for the one or more microservices within the consistency group is further based upon a system consistency group including all microservices within the microservice architecture. The system consistency group may indicate concurrency or total resource usage among all microservices within the microservice architecture. In some instances, satisfaction of the one or more soft thresholds (discussed with reference to act 404) triggers a notification. In some instances, throttling resource utilization includes utilizing routing slip techniques to issue throttling for the particular microservice within the consistency group.

Act 502 of method 500 of FIG. 5 includes obtaining, via a monitor engine, a resource utilization associated with a set of parameters for each microservice within a consistency group, wherein each microservice within the consistency group is associated with a particular distributed operation within the microservice architecture, and wherein the consistency group defines, for each microservice within the consistency group, one or more threshold values associated with each parameter of the set of parameters. The microservice(s) within the consistency group may be identified based upon a trace ID associated with the particular distributed operation within the microservice architecture. In some implementations, each microservice within the consistency group is associated with a service category within the microservice architecture. In some instances, at least one microservice within the consistency group is associated with one or more other consistency groups within the microservice architecture. In some implementations, the set of parameters includes one or more of: processor usage, memory usage, heap usage, swap usage, number of threads, number of file descriptors, number of transmission control protocol connections, jobs distribution, elastic search latency, garbage collection pause, or garbage collection latency. In some instances, at least some of the one or more threshold values are determined based upon one or more service level agreements. In some implementations, the one or more threshold values include one or more soft thresholds and one or more hard thresholds for at least some parameters of the set of parameters. In some instances, the monitor engine publishes the resource utilization associated with the set of parameters for each microservice within the consistency group to a message bus. In some implementations, the resource utilization is published to the message bus utilizing routing slip techniques.

Act 504 of method 500 includes determining, via an analytical engine, whether resource utilization satisfies a particular threshold of the one or more threshold values associated with a particular parameter of the set of parameters for a particular microservice within the consistency group. In some implementations, the analytical engine accesses the resource utilization from the message bus to determine whether the resource utilization satisfies the threshold of the one or more threshold values associated with the particular parameter of the set of parameters for the particular microservice within the consistency group. In some instances, the particular threshold of the one or more threshold values includes a hard threshold of the one or more hard thresholds.

Act 506 of method 500 includes, based upon resource utilization satisfying the particular threshold of the particular parameter for the particular microservice within the consistency group, implementing a self-healing process to selectively modify resource allocation for one or more microservices within the consistency group. In some instances, the self-healing process utilizes routing slip techniques to facilitate selective modification of resource allocation for the one or more microservices within the consistency group. In some implementations, the self-healing process includes dynamically increasing resource allocation for the one or more microservices within the consistency group. In some instances, the self-healing process includes dynamically adjusting (e.g., reducing) resource allocation for one or more services involved with the particular operation within the microservice architecture. The one or more services may be within a different consistency group than the particular microservice, and the one or more services may be selected based upon a priority level associated with the consistency group or the different consistency group. In some implementations, the self-healing process is further based upon a system consistency group including all microservices within the microservice architecture. The system consistency group may indicate concurrency or total resource usage among all microservices within the microservice architecture. In some implementations, wherein satisfaction of the one or more soft thresholds (e.g., discussed with reference to act 504) triggers a notification.

Act 602 of method 600 of FIG. 6 includes obtaining, via a monitor engine, a resource utilization associated with a set of parameters for each microservice within a set of consistency groups, wherein, for each particular consistency group within the set of consistency groups, each microservice within the particular consistency group is associated with a particular distributed operation within the microservice architecture, and wherein each respective consistency group of the set of consistency groups defines, for each microservice within the respective consistency group, one or more threshold values associated with each parameter of the set of parameters. In some implementations, each microservice within the set of consistency groups is associated with a service category within the microservice architecture. In some instances, at least one microservice within the set of consistency groups is associated with multiple consistency groups within the set of consistency groups. In some implementations, the set of parameters includes one or more of: processor usage, memory usage, heap usage, swap usage, number of threads, number of file descriptors, number of transmission control protocol connections, jobs distribution, elastic search latency, garbage collection pause, or garbage collection latency. In some instances, wherein at least some of the one or more threshold values are determined based upon one or more service level agreements. In some implementations, the one or more threshold values include one or more soft thresholds and one or more hard thresholds for at least some parameters of the set of parameters. In some instances, the monitor engine publishes the resource utilization associated with the set of parameters for each microservice within the set of consistency groups to a message bus. In some implementations, the resource utilization is published to the message bus utilizing routing slip techniques.

Act 604 of method 600 includes, for a first consistency group of the set of consistency groups, determining, via an analytical engine, whether first resource utilization satisfies a first particular threshold of the one or more threshold values associated with a first particular parameter of the set of parameters for a first particular microservice within the first consistency group. Act 606 of method 600 includes, for a second consistency group of the set of consistency groups, determining, via the analytical engine, whether second resource utilization satisfies a second particular threshold of the one or more threshold values associated with a second particular parameter of the set of parameters for a second particular microservice within the second consistency group. In some implementations, the first particular threshold and the second particular threshold of the one or more threshold values includes a hard threshold of the one or more hard thresholds. In some instances, the analytical engine accesses the resource utilization from the message bus to determine whether first resource utilization satisfies a first particular threshold of the one or more threshold values associated with a first particular parameter of the set of parameters for a first particular microservice within the first consistency group and whether second resource utilization satisfies a second particular threshold of the one or more threshold values associated with a second particular parameter of the set of parameters for a second particular microservice within the second consistency group.

Act 608 of method 600 includes determining a first priority level associated with the first consistency group and a second priority level associated with the second consistency group. Act 610 of method 600 includes, based upon the first resource utilization satisfying the first particular threshold of the first particular parameter for the first particular microservice within the first consistency group and the second resource utilization satisfying the second particular threshold of the second particular parameter for the second particular microservice within the second consistency group, selectively modifying resource utilization for one or more microservices within the first consistency group or the second consistency group in accordance with the first priority level associated with the first consistency group and the second priority level associated with the second consistency group. In some implementations, selectively modifying resource utilization for one or more microservices within the first consistency group or the second consistency group in accordance with the first priority level associated with the first consistency group and the second priority level associated with the second consistency group utilizes routing slip techniques. In some instances, selectively modifying resource utilization for the one or more microservices within the first consistency group or the second consistency group includes throttling resource utilization for the one or more microservices within the first consistency group or the second consistency group. In some implementations, selectively modifying resource utilization for the one or more microservices within the first consistency group or the second consistency group includes dynamically increasing resource allocation for the one or more microservices within the first consistency group or the second consistency group. In some instances, selectively modifying resource utilization for the one or more microservices within the first consistency group or the second consistency group is further based upon a system consistency group including all microservices within the microservice architecture. The system consistency group may indicate concurrency or total resource usage among all microservices within the microservice architecture. In some implementations, satisfaction of the one or more soft thresholds (discussed with reference to acts 604 and 606) triggers a notification.

Consistency groups of microservices within microservice architectures, as described herein, may provide a logical basis for provisioning costs of systems and/or operations with microservice architectures. An operational cost may be associated with consistency groups within a microservice architecture, thereby enabling the total cost of a system that includes various operations to be determined by calculating a sum of the cost associated with each of the consistency groups (e.g., each consistency group associated with the various operations of the system). Such functionality may be beneficial for enabling customers to receive meaningful pricing estimates for custom systems or service/operation offerings.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may include hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions include, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that includes an instance of an application that includes the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not include an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 7:
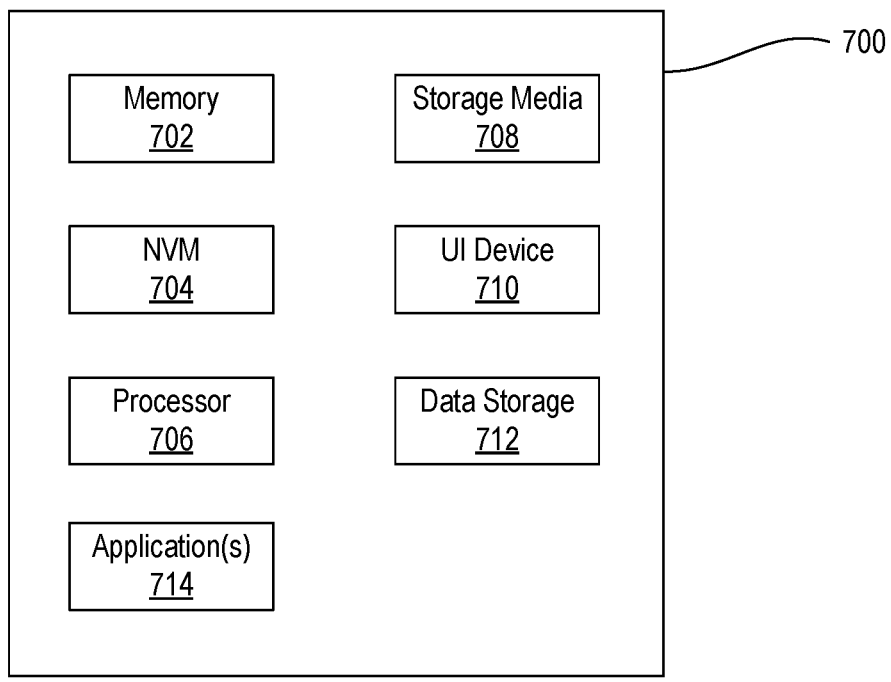
FIG. 7 illustrates aspects of an example computing entity that may be operable to perform any of the disclosed methods, processes, and/or operations.

With reference briefly now to FIG. 7, any one or more of the entities disclosed or implied elsewhere herein, may take the form of, or include, or be implemented on, or hosted by, a physical computing device, one example of which is denoted at 700, and which may include classical computing infrastructure. As well, where any of the aforementioned elements include or consist of a virtual machine (VM), that VM may constitute a virtualization of any combination of the physical components disclosed in FIG. 7.

In the example of FIG. 7, the physical computing device 700 includes a memory 702 which may include one, some, or all, of random access memory (RAM), non-volatile memory (NVM) 704 such as NVRAM for example, read-only memory (ROM), and persistent memory, one or more hardware processors 706, non-transitory storage media 708, a UI (user interface) device 710, and data storage 712. One or more of the memory 702 components of the physical computing device 700 may take the form of solid state device (SSD) storage. As well, one or more applications 714 may be provided that include instructions executable by one or more hardware processors 706 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
within a microservice architecture:
grouping microservices operating in the microservice architecture into consistency groups;
obtaining, via a monitor engine, a resource utilization associated with a set of parameters for each microservice within a consistency group included in the consistency groups, wherein each microservice within the consistency group is associated with a particular distributed operation within the microservice architecture, and wherein the consistency group defines, for each microservice within the consistency group, one or more threshold values associated with each parameter of the set of parameters;
determining, via an analytical engine, whether resource utilization satisfies a particular threshold of the one or more threshold values associated with a particular parameter of the set of parameters for a particular microservice within the consistency group;
determining consistency group performance parameters and determining a second resource utilization for the consistency group;
determining whether a second resource utilization satisfies a group performance threshold; and
based upon resource utilization satisfying the particular threshold of the particular parameter for the particular microservice within the consistency group and based upon the second resource utilization satisfying the group performance threshold, implementing a self-healing process to selectively modify resource allocation for one or more microservices within the consistency group.

2. The method of claim 1, wherein the self-healing process comprises dynamically increasing resource allocation for the one or more microservices within the consistency group.

3. The method of claim 2, wherein the self-healing process is further based upon a system consistency group comprising all microservices within the microservice architecture, wherein the system consistency group indicates concurrency or total resource usage among all microservices within the microservice architecture.

4. The method of claim 2, wherein the self-healing process comprises dynamically adjusting resource allocation for one or more services involved with the particular operation within the microservice architecture.

5. The method of claim 4, wherein the one or more services are within a different consistency group than the particular microservice.

6. The method of claim 5, wherein the one or more services are selected based upon a priority level associated with the consistency group or the different consistency group.

7. The method of claim 1, wherein each microservice within the consistency group is associated with a service category within the microservice architecture.

8. The method of claim 1, wherein at least one microservice within the consistency group is associated with one or more other consistency groups within the microservice architecture.

9. The method of claim 1, further comprising:
identifying the microservice(s) within the consistency group based upon a trace ID associated with the particular distributed operation within the microservice architecture.

10. The method of claim 1, wherein the set of parameters includes one or more of: processor usage, memory usage, heap usage, swap usage, number of threads, number of file descriptors, number of transmission control protocol connections, jobs distribution, elastic search latency, garbage collection pause, or garbage collection latency.

11. The method of claim 1, wherein at least some of the one or more threshold values are determined based upon one or more service level agreements.

12. The method of claim 1, wherein the one or more threshold values comprise one or more soft thresholds and one or more hard thresholds for at least some parameters of the set of parameters.

13. The method of claim 12, wherein the particular threshold of the one or more threshold values comprises a hard threshold of the one or more hard thresholds.

14. The method of claim 13, wherein satisfaction of the one or more soft thresholds triggers a notification.

15. The method of claim 1, wherein the monitor engine publishes the resource utilization associated with the set of parameters for each microservice within the consistency group to a message bus.

16. The method of claim 15, wherein the analytical engine accesses the resource utilization from the message bus to determine whether the resource utilization satisfies the threshold of the one or more threshold values associated with the particular parameter of the set of parameters for the particular microservice within the consistency group.

17. The method of claim 16, wherein the resource utilization is published to the message bus utilizing routing slip techniques.

18. The method of claim 1, wherein the self-healing process utilizes routing slip techniques to facilitate selective modification of resource allocation for the one or more microservices within the consistency group.

19. A system, comprising:
one or more processors; and
one or more non-transitory hardware storage devices that store instructions that are executable by the one or more processors to configure the system to:
within a microservice architecture:
group microservices operating in the microservice architecture into consistency groups;
obtain, via a monitor engine, a resource utilization associated with a set of parameters for each microservice within a consistency group included in the consistency groups, wherein each microservice within the consistency group is associated with a particular distributed operation within the microservice architecture, and wherein the consistency group defines, for each microservice within the consistency group, one or more threshold values associated with each parameter of the set of parameters;
determine, via an analytical engine, whether resource utilization satisfies a particular threshold of the one or more threshold values associated with a particular parameter of the set of parameters for a particular microservice within the consistency group;
determine consistency group performance parameters and determining a second resource utilization for the consistency group;
determine whether a second resource utilization satisfies a group performance threshold; and
based upon resource utilization satisfying the particular threshold of the particular parameter for the particular microservice within the consistency group and based upon the second resource utilization satisfying the group performance threshold, implement a self-healing process to selectively modify resource allocation for one or more microservices within the consistency group.

20. One or more non-transitory hardware storage devices that store instructions that are executable by one or more processors of a system to configure the system to:
within a microservice architecture:
group microservices operating in the microservice architecture into consistency groups;
obtain, via a monitor engine, a resource utilization associated with a set of parameters for each microservice within a consistency group included in the consistency groups, wherein each microservice within the consistency group is associated with a particular distributed operation within the microservice architecture, and wherein the consistency group defines, for each microservice within the consistency group, one or more threshold values associated with each parameter of the set of parameters;
determine, via an analytical engine, whether resource utilization satisfies a particular threshold of the one or more threshold values associated with a particular parameter of the set of parameters for a particular microservice within the consistency group;
determine consistency group performance parameters and determining a second resource utilization for the consistency group;
determine whether a second resource utilization satisfies a group performance threshold; and
based upon resource utilization satisfying the particular threshold of the particular parameter for the particular microservice within the consistency group and based upon the second resource utilization satisfying the group performance threshold, implement a self-healing process to selectively modify resource allocation for one or more microservices within the consistency group.

* * * * *